(12) United States Patent
He

(10) Patent No.: US 10,601,670 B2
(45) Date of Patent: Mar. 24, 2020

(54) WIDE-AREA NETWORK AUTOMATIC DETECTION

(71) Applicant: ARRIS Enterprises LLC, Suwanee, GA (US)

(72) Inventor: Jiafu He, Tyngsboro, MA (US)

(73) Assignee: ARRIS Enterprises LLC, Suwanee, GA (US)

(*) Notice: Subject to any disclaimer, the term of this patent is extended or adjusted under 35 U.S.C. 154(b) by 0 days.

(21) Appl. No.: 15/907,622

(22) Filed: Feb. 28, 2018

(65) Prior Publication Data

US 2018/0248763 A1 Aug. 30, 2018

Related U.S. Application Data

(60) Provisional application No. 62/464,566, filed on Feb. 28, 2017, provisional application No. 62/469,269, filed on Mar. 9, 2017.

(51) Int. Cl.
| | |
|---|---|
| *H04L 12/24* | (2006.01) |
| *H04L 12/26* | (2006.01) |
| *H04L 12/46* | (2006.01) |
| *H04L 12/28* | (2006.01) |
| *H04L 29/06* | (2006.01) |
| *H04L 29/12* | (2006.01) |
| *H04W 12/06* | (2009.01) |

(52) U.S. Cl.
CPC .......... *H04L 41/12* (2013.01); *H04L 12/2854* (2013.01); *H04L 12/2898* (2013.01); *H04L 12/4641* (2013.01); *H04L 41/0806* (2013.01); *H04L 41/0886* (2013.01); *H04L 43/0811* (2013.01); *H04L 43/10* (2013.01); *H04L 43/12* (2013.01); *H04L 61/2015* (2013.01); *H04L 63/0876* (2013.01); *H04W 12/06* (2013.01); *H04L 41/0681* (2013.01)

(58) Field of Classification Search
None
See application file for complete search history.

(56) References Cited

U.S. PATENT DOCUMENTS

| | | | | |
|---|---|---|---|---|
| 2005/0286503 A1* | 12/2005 | Oda | ..................... | H04L 12/2859 370/355 |
| 2006/0129677 A1* | 6/2006 | Tamura | ............... | H04L 61/2015 709/227 |

(Continued)

OTHER PUBLICATIONS

PCT International Search Report & Written Opinion, RE: Application No. PCT/US2018/020199, dated May 15, 2018.

(Continued)

*Primary Examiner* — Hassan A Phillips
*Assistant Examiner* — Gautam Sharma
(74) *Attorney, Agent, or Firm* — Bart A. Perkins

(57) ABSTRACT

Methods, systems, and computer readable media can be operable to facilitate an automatic detection of WAN (wide-area network) configurations. A CPE (customer premise equipment) device may generate and output one or more probing packets to one or more upstream network elements. The CPE device may receive one or more probing packet responses from one or more of the upstream network elements. Based upon the received probing packet response(s), the CPE device may determine WAN configurations and parameters, and the CPE device may set WAN configurations accordingly.

17 Claims, 7 Drawing Sheets

(56) References Cited

U.S. PATENT DOCUMENTS

| | | | |
|---|---|---|---|
| 2006/0137005 A1* | 6/2006 | Park .................. H04L 29/12009 726/21 |
| 2006/0168270 A1* | 7/2006 | Townsley .............. H04L 69/168 709/230 |
| 2006/0245439 A1* | 11/2006 | Sajassi ................ H04L 12/2881 370/400 |
| 2006/0274674 A1* | 12/2006 | Okita .................. H04L 41/0806 370/254 |
| 2007/0058538 A1 | 3/2007 | Chiang et al. |
| 2007/0058567 A1* | 3/2007 | Harrington .......... H04L 12/2856 370/254 |
| 2007/0121617 A1* | 5/2007 | Kanekar ............. H04L 12/4641 370/389 |
| 2007/0195804 A1* | 8/2007 | Ijima .................. H04L 12/2856 370/401 |
| 2007/0204330 A1* | 8/2007 | Townsley .............. H04L 9/3271 726/4 |
| 2008/0062999 A1* | 3/2008 | Platnic ................ H04L 12/2803 370/401 |
| 2008/0298809 A1* | 12/2008 | Zheng ................ H04L 12/2881 398/118 |
| 2009/0129386 A1* | 5/2009 | Rune .................. H04L 12/2881 370/392 |
| 2009/0144442 A1* | 6/2009 | Zheng ................ H04L 12/2878 709/236 |
| 2010/0293233 A1* | 11/2010 | Salam ................ H04L 12/4641 709/206 |
| 2014/0115142 A1 | 4/2014 | Peng et al. |
| 2014/0280467 A1* | 9/2014 | Huang ................ H04L 61/2015 709/203 |

OTHER PUBLICATIONS

J. Edney, et al., "Real 802.11 Security: Wi-Fi Protected Access and 802.11i", Mar. 1, 2004, retrieved from the Internet URL:https://books.google.de/books?isbn=0321136209 on May 4, 2018.

"IEEE Standard for Local and Metropolitan Area Networks—Port-Based Network Access Control; IEEE Std 802.1X-2010 (Revision of IEEE Std 802.1X-2004", IEEE Standard, Feb. 5, 2010.

\* cited by examiner

WIDE-AREA NETWORK AUTOMATIC DETECTION

CROSS REFERENCE TO RELATED APPLICATION

This application is a non-provisional application claiming the benefit of U.S. Provisional Application Ser. No. 62/464,566, entitled "Wide-Area Network Parallel Auto-Detection," which was filed on Feb. 28, 2017, and is incorporated herein by reference in its entirety. This application further claims the benefit of U.S. Provisional Application Ser. No. 62/469,269, entitled "Wide-Area Network Auto-Detection Feature," which was filed on Mar. 9, 2017, and is incorporated herein by reference in its entirety.

TECHNICAL FIELD

This disclosure relates to an automatic detection of wide-area network parameters and configurations.

BACKGROUND

Customer networks typically include a hybrid of WAN (wide-area network) technologies. For example, wire connections may be by xDSL, pure Ethernet, Fiber, or others. The authentication may be 802.1x supplicant or PPPoE. The IP WAN protocol may be DHCP instead of PPPoE. Moreover, either the supplicant and/or data traffic may be 802.1q VLAN tagged or untagged. The number of combinations of possible WAN interface configurations continues to grow. WAN detection may be carried out by cycling through all the possible cases one after another. However, this method of WAN detection is time consuming. Therefore, it is desirable to improve upon methods and systems for detecting WAN configurations and parameters.

BRIEF DESCRIPTION OF THE DRAWINGS

Like reference numbers and designations in the various drawings indicate like elements.

DETAILED DESCRIPTION

As a preliminary matter, it readily will be understood by those persons skilled in the art that the present invention is susceptible of broad utility and application. Many methods, embodiments and adaptations of the present invention other than those herein described, as well as many variations, modifications, and equivalent arrangements, will be apparent from or reasonably suggested by the present invention and the following description thereof, without departing from the substance or scope of the present invention.

Accordingly, while the present invention has been described herein in detail in relation to preferred embodiments, it is to be understood that this disclosure is only illustrative and exemplary of the present invention and is made merely for the purposes of providing a full and enabling disclosure of the invention. The disclosure is not intended nor is to be construed to limit the present invention or otherwise to exclude any such other embodiments, adaptations, variations, modifications and equivalent arrangements, the present invention being limited only by the claims appended hereto and the equivalents thereof.

It is desirable to improve upon methods and systems for detecting WAN configurations and parameters. Methods, systems, and computer readable media can be operable to facilitate an automatic detection of WAN (wide-area network) configurations. A CPE (customer premise equipment) device may generate and output one or more probing packets to one or more upstream network elements. The CPE device may receive one or more probing packet responses from one or more of the upstream network elements. Based upon the received probing packet response(s), the CPE device may determine WAN configurations and parameters, and the CPE device may set WAN configurations accordingly.

Figure 1:
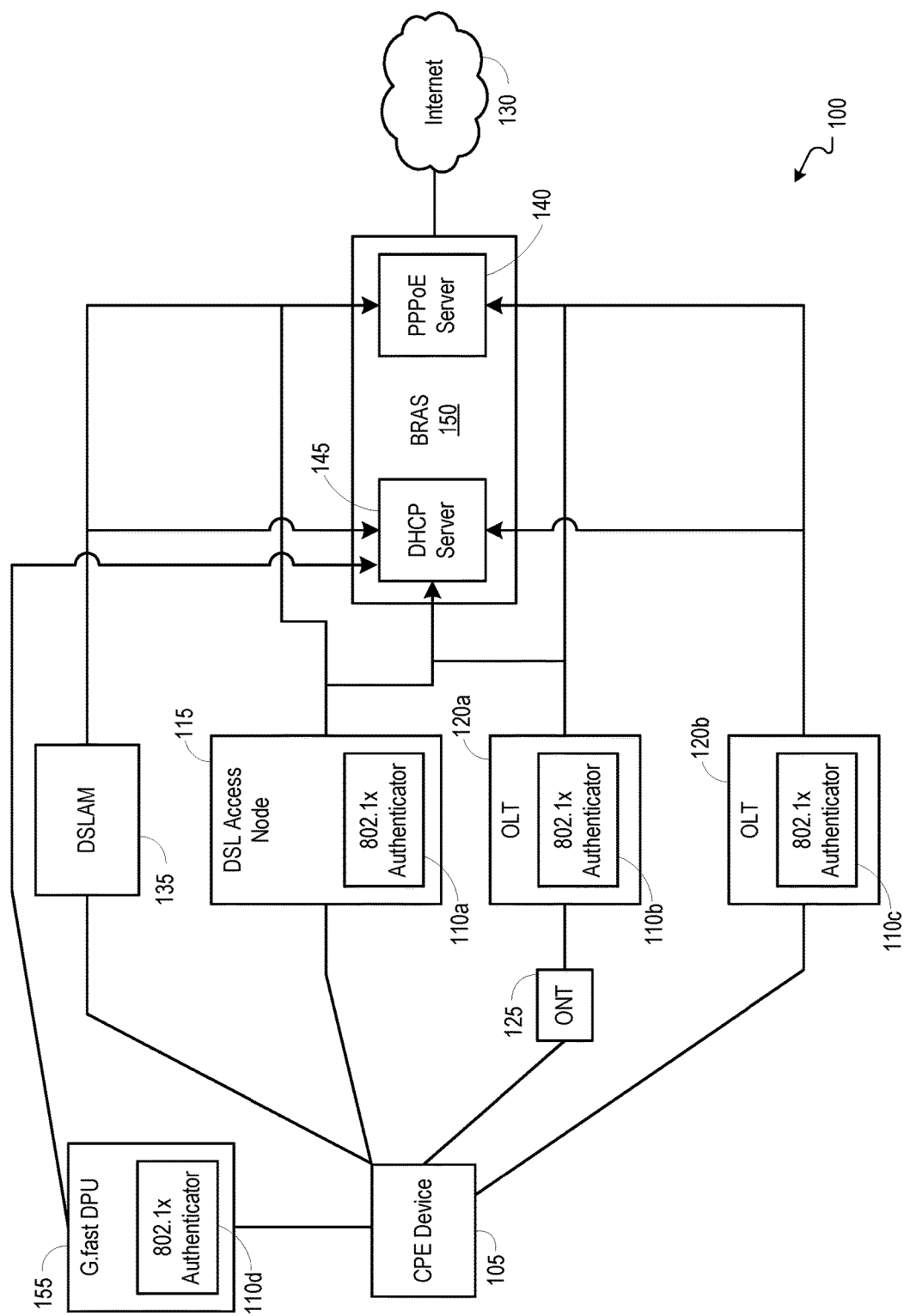
FIG. 1 is a block diagram illustrating an example network environment operable to facilitate an automatic detection of WAN (wide-area network) configurations.

FIG. 1 is a block diagram illustrating an example network environment 100 operable to facilitate an automatic detection of WAN (wide-area network) configurations. In embodiments, a CPE device 105 may be configured to communicate over one or more upstream networks. The one or more upstream networks over which a CPE device 105 may receive and send communications may include a hybrid of WAN (wide-area network) technologies. For example, the CPE device 105 may include one or more wired interfaces (e.g., xDSL (digital subscriber line), Ethernet, Fiber, etc.) that are configured to receive and send communications over one or more upstream networks. Authentication may occur via 802.1x supplicant (PAE (port access entity)) or PPPoE (point-to-point protocol over Ethernet). In embodiments, an IP (Internet protocol) WAN protocol (e.g., ISP (Internet service provider) IP protocol) associated with an upstream connection may be DHCP (dynamic host configuration protocol) or PPPoE. The associated supplicant and/or data traffic may be 802.1q VLAN (virtual local area network) tagged or untagged. For example, the data link layer may be untagged or 802.1q VLAN tagged with VIDs (VLAN identifiers) 101, 70, 201, or 0, and the 802.1x supplicant may be untagged or priority tagged.

In embodiments, the CPE device 105 may output one or more probing packets and may configure one or more WAN settings at the CPE device 105 based upon responses that are received in response to the one or more probing packets. For example, the CPE device 105 may initiate a probe of a WAN-side network by simultaneously outputting one or more probing packets that are targeted for one or more upstream network elements (e.g., 802.1x supplicant authenticator, DHCP server, PPP server, etc.). The probing packets may be output in parallel (e.g., the probing packets are simultaneously output) from the CPE device 105. The CPE device 105 may determine one or more deployed VLANs by simultaneously outputting a copy of each probing packet over each VLAN. The CPE device 105 may receive one or more probing packet responses and may analyze the received probing packet response(s) to determine the presence or absence of one or more of the targeted network elements.

In embodiments, where a WAN physical link is up, but no probing packet responses are received, the CPE device 105 may continue to output probing packets at a pre-configured interval.

In embodiments, one or more drivers of the CPE device 105 may automatically detect Layer 1 PHY port (e.g., ADSL2+(asymmetric digital subscriber line, VDSL (very-high-bit-rate digital subscriber line), Ethernet, etc.), line mode, and auto VPI (virtual path identifier)/VCI (virtual circuit identifier) for ATM DSL (asynchronous transfer mode DSL) when a physical cable is plugged into a port of the CPE device 105.

In embodiments, when one or more PHY ports are detected, the CPE device 105 may identify one of the PHY ports for outputting the one or more probing packets. The CPE device 105 may identify the PHY port to be used for outputting the one or more probing packets based upon a precedence (i.e., priority) level assigned to each PHY port. For example, an FSM (finite state machine) of the CPE device 105 may be utilized to select the connected PHY port having the highest precedence relative to the one or more connected PHY ports of the CPE device 105, and the selected PHY port may be utilized to output the one or more probing packets.

In embodiments, the CPE device 105 may initiate a WAN probing process. The WAN probing process may be initiated when a trigger for detecting WAN settings is identified. A trigger for detecting WAN settings may be a reboot of the CPE device 105, a WAN PHY port change, a UI (user interface) configuration change, or other triggering event. The WAN probing process may be initiated when two or more PHY ports are connected and the highest priority PHY port is disconnected. The WAN probing process may be initiated when a PHY port is connected at the CPE device 105 and the PHY port has a higher priority than one or more PHY ports currently or previously connected at the CPE device 105. When the highest priority PHY port is disconnected, the next highest priority port may take over. The CPE device 105 may probe the WAN side network with a number of probing packets (e.g., 802.1x EAPOL START, PPPoE PADI, DHCP DISCOVER, etc.) by outputting the probing packets in parallel. The probing packets (i.e., copies of the probing packets) may be output over each of one or more VLANs which the CPE device 105 is configured to use. For example, the probing packets (i.e., copies of the probing packets) may be output over each of one or more VLANs that are identified from a VLAN search list with which the CPE device 105 is configured.

In embodiments, an 802.1x authenticator 110a-d may be located at a DSL access node 115 (e.g., ADSL2+/VDSL PTM (packet transfer mode) ISAM (intelligent services access manager), etc.) and/or one or more OLTs (optical line terminals) 120a-b. The CPE device 105 may communicate directly with an OLT (i.e., OLT 120b) or may communicate with an OLT (i.e., OLT 120a) through an ONT (optical network terminal) 125. In embodiments, the CPE device 105 may communicate with the Internet 130 through a connection to a DSLAM (digital subscriber line access multiplexer) 135 (e.g., ADSL2+ ATM DSLAM, etc.), a DSL access node 115, and/or an OLT 120a-b.

In embodiments, an 802.1x authenticator 110a-d may use EAP (extensible authentication protocol) to authenticate a customer's identity. For example, an 802.1x authenticator 110a-d may retrieve an identifier associated with the CPE device 105 (e.g., MAC (media access control) address, etc.) and may authenticate the identifier over an encrypted session (e.g., TLS (transport layer security), etc.). An 802.1x authenticator 110a-d may retrieve an identifier associated with the CPE device 105 from a probing packet that is received from the CPE device 105.

In embodiments, responses to the probing packets may be collected by the CPE device 105. The CPE device 105 may collect probing packet responses for a certain duration (e.g., for a configured timeout duration of 10, 15, 20 seconds, etc.). If no probing packet responses are received upon the expiration of the certain duration, the CPE device 105 may output another round of probing packets. If one or more probing packet responses are received by the CPE device 105, the CPE device 105 may generate a report at the expiration of the certain duration. The report may provide an indication of whether an 802.1x authenticator has been detected and an identification of a VLAN over which the 802.1x authenticator was detected, whether a PPPoE server 140 has been detected and an identification of a VLAN over which the PPPoE server 140 was detected, whether a DHCP server 145 has been detected, an identification of a VLAN over which the DHCP server 145 was detected, an IP used by the DHCP server 145, and/or other information gathered from the received probing packet response(s). A PPPoE server 140 and/or a DHCP server 145 may be located at a BRAS (broadband remote access server) 150.

In embodiments, an 802.1x authenticator 110d may be located at a G.fast DPU (distribution point unit) 155. A DHCP server 145 may be reached through the G.fast DPU 155.

In embodiments, in response to a detection of an 802.1x authenticator 110a-d, the CPE device 105 may setup a VLAN associated with the supplicant and may initiate an authentication over the VLAN interface. For example, the CPE device 105 may be authenticated through a handshake process occurring between the CPE device 105 and the 802.1x authenticator 110a-d over a TLS encryption tunnel. When authentication of the CPE device 105 passes, the 802.1x authenticator 110a-d may enable the forwarding of other packet types (i.e., 802.1x supplicant packets and packets other than 802.1x supplicant packets).

Before authentication of the CPE device 105 passes, the 802.1x authenticator 110a-d may block all packets other than 802.1x supplicant packets. Therefore, if an 802.1x authenticator 110a-d is detected, the CPE device 105 may repeat the step of outputting probing packets, except that the CPE device 105 may preclude the output of an 802.1x EAPOL START packet.

In embodiments, based upon the one or more received probing packet responses, the CPE device 105 may select a highest priority VLAN that is identified from the probing packet responses.

In embodiments, based upon the one or more received probing packet responses, the CPE device 105 may select a WAN protocol to setup, and the CPE device 105 may initiate a corresponding WAN protocol client (e.g., PPPD (point-to-point protocol daemon), DHCPCD (DHCP daemon), etc.). When a DHCP server 145 is recognized, the CPE device 105 may determine whether the retrieved DHCP server IP address is the same as the last or most recently used IP address, and the last or most recently used IP address may be renewed if it is determined to be the same as the retrieved DHCP server IP address.

In embodiments, where PPPoE is configured as the highest priority protocol for the CPE device 105 and the necessary PPPoE credentials are not properly provided to the CPE device 105 upon a time out, the CPE device 105 may initiate a DHCP configuration as a WAN interface if the received probing packet responses indicate a detection of a DHCP server 145.

In embodiments, when the CPE device 105 successfully acquires an IP address for the WAN interface, the CPE device 105 may proceed with any further setup and/or configuration (e.g., setting up routes, stats, LED, etc.).

Figure 2:
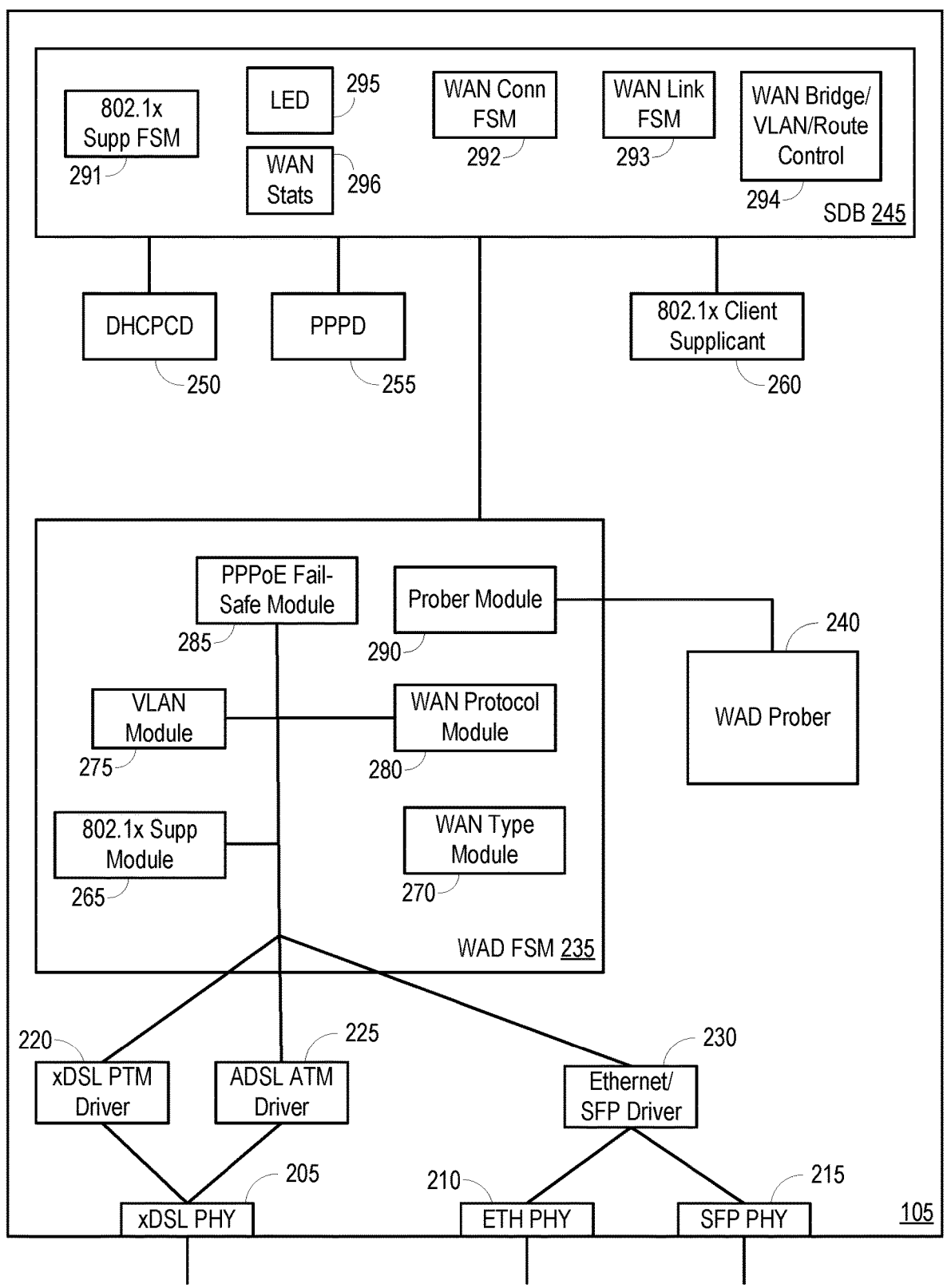
FIG. 2 is a block diagram illustrating an example CPE device operable to facilitate an automatic detection of WAN (wide-area network) configurations.

FIG. 2 is a block diagram illustrating an example CPE device 105 operable to facilitate an automatic detection of WAN (wide-area network) configurations. The CPE device 105 may include an xDSL PHY 205, an ETH PHY 210, a SFP (small form-factor pluggable) PHY 215, an xDSL PTM driver 220, an ADSL ATM driver 225, an Ethernet/SFP driver 230, a WAD FSM 235, a WAD prober 240, a SDB 245, a DHCPCD 250, a PPPD 255, and an 802.1x client supplicant 260. The WAD FSM 235 may include an 802.1x supp (supplicant) module 265, a WAN type module 270, a VLAN module 275, a WAN protocol module 280, a PPPoE fail-safe module 285, and a prober module 290. The SDB 245 may include an 802.1x supp (supplicant) FSM 291, a WAN conn (connection) FSM 292, a WAN link FSM 293, a WAN bridge/VLAN/route control 294, LED 295, and WAN stats 296.

In embodiments, the CPE device 105 may be configured to communicate over one or more upstream networks. For example, the CPE device 105 may include one or more wired interfaces or physical ports (e.g., xDSL PHY 205, ETH PHY 210, SFP PHY 215, etc.) that are configured to receive and send communications over one or more upstream networks.

In embodiments, one or more drivers of the CPE device 105 may automatically detect Layer 1 PHY port (e.g., ADSL2+(asymmetric digital subscriber line, VDSL (very-high-bit-rate digital subscriber line), Ethernet, etc.), line mode, and auto VPI (virtual path identifier)/VCI (virtual circuit identifier) for ATM DSL (asynchronous transfer mode DSL) when a physical cable is plugged into a port of the CPE device 105. For example, an xDSL PTM driver 220 and/or an ADSL ATM driver 225 may detect Layer 1 PHY port, line mode, and/or auto VPI/VCI when a physical cable is plugged into the xDSL PHY 205, and an Ethernet/SFP driver 230 may detect Layer 1 PHY port and/or line mode when a physical cable is plugged into the ETH PHY 210 and/or SFP PHY 215.

In embodiments, when the CPE device 105 is operating in a full static configuration mode or a DHCP static IP mode, all or part of the WAD FSM 235 may be bypassed. For example, when configured in DHCP static IP mode, a DHCP server is not available on the service provider's WAN network to respond to probing packets. When configured in DHCP static IP mode, autodetection may be carried out at the PHY driver level (e.g., the PHY line mode may be automatically detected), and the 802.1x supplicant, VLAN, and DNS settings may be configured manually.

In embodiments, when QoS (quality of service) queues are properly setup for a PHY port, a PHY port driver (e.g., xDSL PTM driver 220, ADSL ATM driver 225, Ethernet/SFP driver 230, etc.) may notify the WAD FSM 235 of the activated PHY port(s). When a cable is unplugged from a PHY port (e.g., xDSL PHY 205, ETH PHY 210, SFP PHY 215, etc.) or when a "reset DSL" command is issued, a PHY port driver may notify the WAD FSM 235 of the deactivated PHY port(s).

In embodiments, when one or more PHY ports are detected, the WAD FSM 235 may identify one of the PHY ports for outputting one or more probing packets. The WAD FSM 235 may identify the PHY port to be used for outputting the one or more probing packets based upon a precedence (i.e., priority) level assigned to each PHY port. For example, the WAN type module 270 may select the connected PHY port having the highest precedence relative to the one or more connected PHY ports of the CPE device 105, and the selected PHY port may be utilized to output the one or more probing packets. The precedence or priority level for each PHY port may be determined based upon a WAN search list that is configured at the WAN type module 270. The other, non-selected, PHY ports may be disabled.

In embodiments, the WAN search list may include a list of WAN port names and an explicit and/or implicit (e.g., the closer a WAN port name is located to the head of the WAN search list, the higher the precedence/priority of the port) indication of a precedence or priority given to a corresponding WAN port name. For example, the WAN search list may contain the value of "dsl fiber ethernet," which indicates that the "dsl" port has the highest precedence, "fiber" next highest precedence, and "ethernet" the lowest precedence. Utilizing the WAN search list, a desired port may be favored in the presence of multiple active WAN physical ports.

Upon reboot of the CPE device 105, WAN PHY port state changes, or UI configuration changes, a new round of auto detection at layer 2 and above may be initiated on the highest priority port (e.g., the PHY port selected by the WAN type module 270 for outputting probing packets). Auto detection may also restart when two and more PHY ports were connected, but the highest priority PHY port is disconnected. The second highest priority port on the search-list may then take over as the PHY port over which probing packets are output.

In embodiments, the CPE device 105 may initiate a WAN probing process. The WAD prober 240 may probe the WAN side network with a number of probing packets (e.g., 802.1x EAPOL START, PPPoE PADI, DHCP DISCOVER, etc.) by outputting the probing packets in parallel. The WAD prober 240 may output probing packets (i.e., copies of the probing packets) over each of one or more VLANs. For example, the probing packets (i.e., copies of the probing packets) may be output over each of one or more VLANs that are identified from a VLAN search list with which the CPE device 105 is configured.

In embodiments, the VLAN search list may identify one or more VLANs that are to be scanned, and the VLAN search list may indicate a precedence/priority level associated with each VLAN. The indicated precedence/priority level associated with each VLAN may be used to select a VLAN when multiple VLANs are detected. The VLAN search list may include a list of VIDs and an explicit or implied precedence/priority level associated with each VID (e.g., "101 70 201 none 0" where "none" may refer to "no VLAN"). VIDs included within the VLAN search list may be automatically scanned, a specific VID may be added to the VLAN search list when the specific VID is sought to be scanned.

In embodiments, responses to the probing packets may be received by the CPE device 105 and intercepted by the WAD prober 240. The WAD prober 240 may collect probing packet responses for a certain duration (e.g., for a configured timeout duration of 10, 15, 20 seconds, etc.). If no probing packet responses are received upon the expiration of the certain duration, the WAD prober 240 may output another round of probing packets. If one or more probing packet responses are received by the WAD prober 240, the WAD prober 240 may generate a report at the expiration of the certain duration. The report may provide an indication of whether an 802.1x authenticator (e.g., an 802.1x authenticator 110a-d of FIG. 1) has been detected and an identification of a VLAN over which the 802.1x authenticator was detected, whether a PPPoE server (e.g., PPPoE server 140 of FIG. 1) has been detected and an identification of a VLAN over which the PPPoE server was detected, whether a DHCP server (e.g., DHCP server 145 of FIG. 1) has been detected, an identification of a VLAN over which the DHCP server was detected, an IP used by the DHCP server, and/or other information gathered from the received probing packet response(s).

In embodiments, the report generated by the WAD prober 240 may be output to the SDB 245, and the results gathered from the probing packet responses may be output to the WAD FSM 235.

In embodiments, in response to a detection of an 802.1x authenticator, the CPE device 105 may setup a VLAN associated with the 802.1x client supplicant 260 and the 802.1x client supplicant 260 may initiate an authentication over the VLAN interface. The CPE device 105 may be authenticated through a handshake process occurring between the 802.1x client supplicant 260 and the 802.1x authenticator over a TLS encryption tunnel. For example, the 802.1x client supplicant 260 may instruct the SDB 245 to initiate an 802.1x "eap-tls-peer" client process on the VLAN interface. When authentication of the CPE device 105 passes, the 802.1x authenticator may enable the forwarding of other packet types (i.e., 802.1x supplicant packets and packets other than 802.1x supplicant packets), and the SDB may notify the WAD FSM 235 of the authentication. In response to the notification of the authentication, the WAD prober 240 may initiate a second round of probing in which all probing packets except for 802.1x supplicant packets (e.g., 802.1x EAPOL START packets) are output a second time. If no 802.1x authenticator is detected, only the first round of probing will occur. For example, if a valid DHCP server or PPPoE server is found in the first round, the second round of probing may be precluded.

When a supplicant is deployed, all packets except for 802.1x supplicant packets are discarded before the line port is successfully authenticated. Therefore, probing by the WAD prober 240 may be split into two rounds. During the first round, the 802.1x supplicant is searched and configured accordingly so that the line authentication passes. The supplicant may use a different VLAN tag than regular data traffic. In the second round, VLAN tags for regular traffic and WAN protocols are detected and applied accordingly. For example, in the second round, no supplicant and PPPoE will be probed, and only VLAN and DHCP are explored. In embodiments, a supplicant parameter may be enabled so that priority tags of supplicant packets are not removed when the packets are output.

In embodiments, based upon the one or more received probing packet responses, the CPE device 105 may select a highest priority VLAN that is identified from the probing packet responses. The report generated by the WAD prober 240 may indicate whether a PPPoE server, a DHCP server, or both were detected by the probing packets, and the report may further indicate which VLAN is used by the PPPoE server and/or DHCP server. Based on the report, the WAN bridge/VLAN/route control may setup the highest priority VLAN and bridge. For example, the VLAN module 275 may run a VID through a VLAN search list to identify the highest priority VLAN.

In embodiments, based upon the one or more received probing packet responses, the CPE device 105 may select a WAN protocol to setup, and the CPE device 105 may initiate a corresponding WAN protocol client (e.g., PPPD 255, DHCPCD 250, etc.). The PPPD 255 may negotiate configuration for PPPoE and the DHCPCD 250 may negotiate configuration for DHCP. When a DHCP server is recognized, the CPE device 105 may determine whether the retrieved DHCP server IP address is the same as the last or most recently used IP address, and the last or most recently used IP address may be renewed if it is determined to be the same as the retrieved DHCP server IP address. For example, the WAN protocol module 280 may check a WAN protocol search list to determine which WAN protocol to setup, and the WAN protocol module 280 may initiate the corresponding WAN protocol client.

In embodiments, where PPPoE is configured as the highest priority protocol for the CPE device 105 and the necessary PPPoE credentials are not properly provided to the CPE device 105 upon a time out, the CPE device 105 may initiate a DHCP configuration as a WAN interface if the received probing packet responses indicate a detection of a DHCP server. For example, if PPPoE credentials are not obtained upon the occurrence of a configured time out (e.g., after 3, 4, 5 consecutive unsuccessful PPPoE authentications, etc.), the PPPoE fail-safe module 285 may switch to DHCP for the WAN interface if a DHCP server is detected.

When a WAN configuration is determined based upon the report generated by the WAD prober 240, a notification (e.g., "SDB_IEVT_PORTUP") may be sent to the SDB 245, and the WAN link FSM 293 may initiate a respective WAN IP client (e.g., PPPD 255 or DHCPCD 250). Once initiated, the respective WAN IP client may initiate a hand-shaking process until the WAN interface IP is fully configured. For example the hand-shaking process for DHCP may include a new session DISCOVER-OFFER-REQUEST ACK or a renew session REQUEST-ACK. The hand-shaking process for PPPoE may include PADI-PADO-PADR-PADS, and a PADT may be seen whenever a session is terminated. The hand-shaking process for the 802.1x supplicant may include EAPOL-START-EAP-REQ/IDENTITY-EAP-REPLY/IDENTITY-EAP-REQ/AUTH-EAP-REPLY/AUTH-EAP-SUCCESS.

In embodiments, when the CPE device 105 successfully acquires an IP address for the WAN interface, the CPE device 105 may proceed with any further setup and/or configuration (e.g., setting up routes, stats, LED, etc.). For example, when the PPPD 255 or DHCPCD 250 successfully acquires an IP address for the WAN interface, routes, WAN stats 296, and LED 295 may be setup accordingly under the control of the WAN conn FSM 292.

When operating in the ADSL ATM mode, VPI/VCI may be automatically detected. In embodiments, the ADSL ATM driver 225 may use the first VPI/VCI pair found within a VPI/VCI search list, and the WAD FSM 235 may output probing packets (e.g., PADI and DHCP offer) on the VPI/VCI. If IP configuration fails after a configured time out (e.g., a configured duration or number of attempts), the ADSL ATM driver 225 may select the next VPI/VCI pair found within the VPI/VCI search list, and the WAD FSM 235 may output probing packets over the next VPI/VCI pair. If IP configuration is successful over a VPI/VCI pair, the VPI/VCI pair may be saved. After saving the VPI/VCI, the CPE device 105 may be configured to use the saved VPI/VCI.

In embodiments, the 802.1x supp FSM 201 may control supplicant detection.

In embodiments, the WAN link FSM 293 may handle configurations for a first level of links (e.g., PHY port links).

In embodiments, the WAN conn FSM 292 may handle Layer 3 configuration (e.g., with DHCPCD 250 and PPPD 255).

In embodiments, the WAN bridge/VLAN/route control 294 may handle Layer 2 bridging and configuration of VLAN settings.

In embodiments, the CPE device 105 may generate and output a user interface (e.g., GUI (graphical user interface), webGUI, etc.) that includes a WAN summary which displays data and information associated with the WAN link and connection. The user interface may further include a broadband settings page wherein WAN detection, WAN interface type, VLAN, DSL, and other parameters may be configured by a user. The user interface may include a connection settings page which may be used to configure the WAN protocol and 802.1x supplicant.

Figure 3:
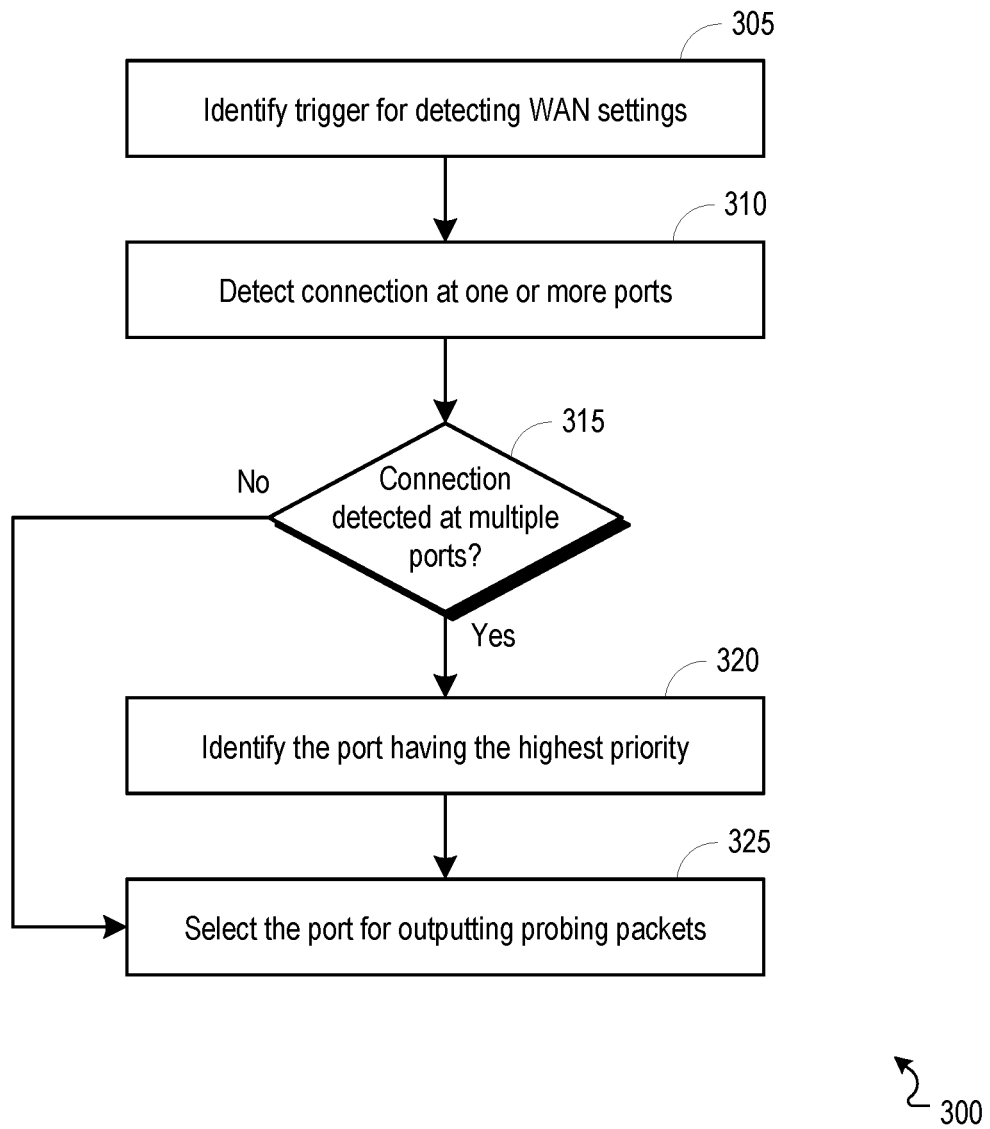
FIG. 3 is a flowchart illustrating an example process operable to facilitate an automatic detection of a preferred port.

FIG. 3 is a flowchart illustrating an example process 300 operable to facilitate an automatic detection of a preferred port. The process 300 may be carried out, for example, by a CPE device 105 of FIG. 1. The process 300 can begin at 305, when a trigger for detecting WAN settings is identified. In embodiments, the trigger for detecting WAN settings may be a reboot of the CPE device 105, a WAN PHY port change, a UI (user interface) configuration change, or other triggering event. The trigger may be an identification of a scenario in which two or more PHY ports are connected and the highest priority PHY port is disconnected. The trigger may be an identification of a scenario in which a PHY port is connected at the CPE device 105 and the PHY port has a higher priority than one or more PHY ports currently or previously connected at the CPE device 105.

At 310, a connection at one or more ports may be detected. For example, the CPE device 105 may include one or more wired interfaces or physical ports (e.g., xDSL PHY 205 of FIG. 2, ETH PHY 210 of FIG. 2, SFP PHY 215 of FIG. 2, etc.) that are configured to receive and send communications over one or more upstream networks. In embodiments, one or more drivers of the CPE device 105 may automatically detect Layer 1 PHY port (e.g., ADSL2+ (asymmetric digital subscriber line, VDSL (very-high-bit-rate digital subscriber line), Ethernet, etc.), line mode, and auto VPI (virtual path identifier)/VCI (virtual circuit identifier) for ATM DSL (asynchronous transfer mode DSL) when a physical cable is plugged into a port of the CPE device 105. For example, an xDSL PTM driver 220 of FIG. 2 and/or an ADSL ATM driver 225 of FIG. 2 may detect Layer 1 PHY port, line mode, and/or auto VPI/VCI when a physical cable is plugged into the xDSL PHY 205, and an Ethernet/SFP driver 230 of FIG. 2 may detect Layer 1 PHY port and/or line mode when a physical cable is plugged into the ETH PHY 210 and/or SFP PHY 215.

At 315, a determination may be made whether connections are detected at multiple ports. If connections are detected at multiple ports, the process 300 may proceed to 320. At 320, the port having the highest priority may be identified. In embodiments, the WAD FSM 235 of FIG. 2 may identify a PHY port to be used for outputting one or more probing packets based upon a precedence (i.e., priority) level assigned to each PHY port. For example, a WAN type module 270 of FIG. 2 may select the connected PHY port having the highest precedence relative to the one or more connected PHY ports of the CPE device 105, and the selected PHY port may be selected, at 325, for use in the output of the one or more probing packets. The precedence or priority level for each PHY port may be determined based upon a WAN search list that is configured at the WAN type module 270.

If, at 315, the determination is made that a connection is detected at only a single port, the process 300 may proceed to 325 where the single port may be selected for use in the output of the one or more probing packets.

Figure 4:
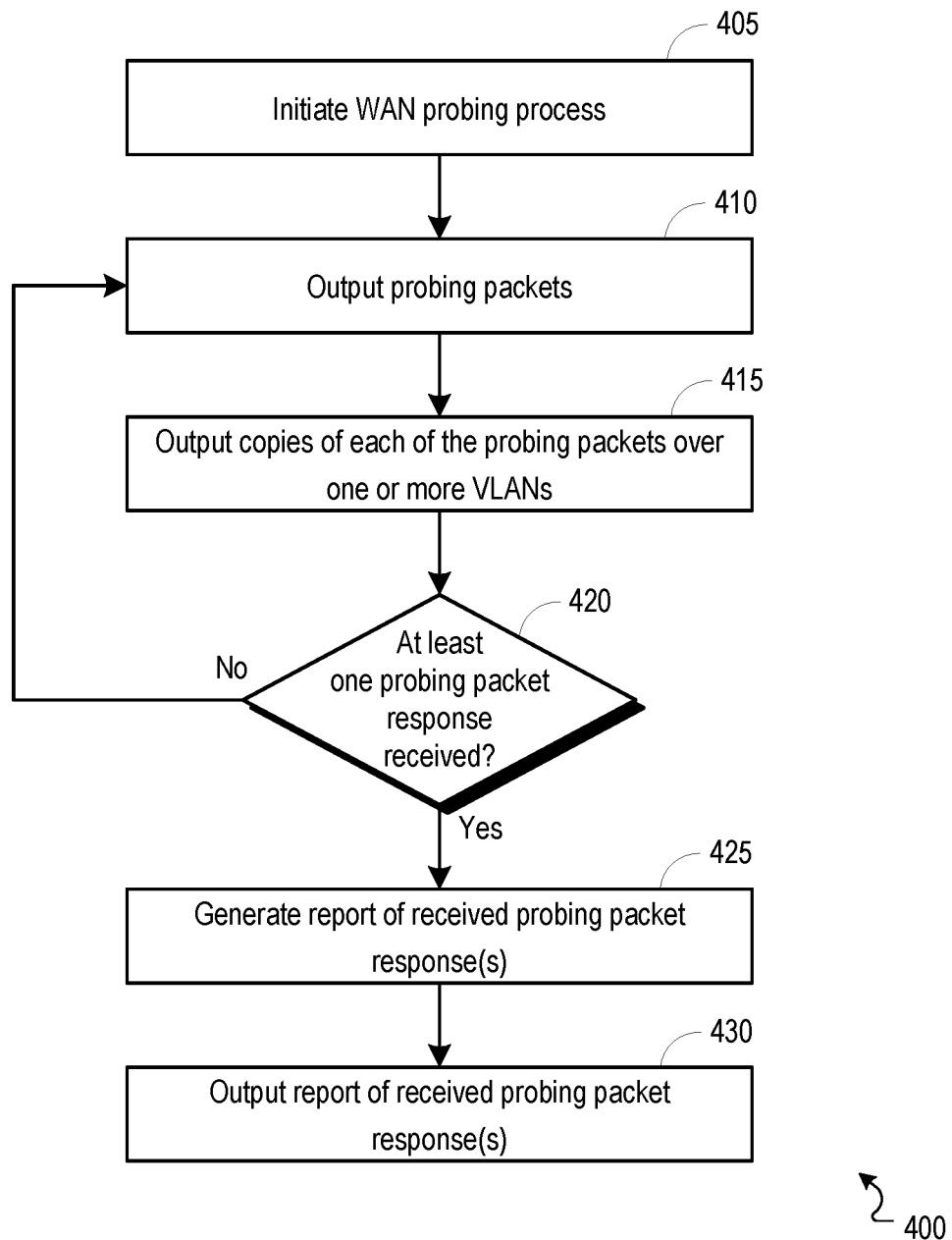
FIG. 4 is a flowchart illustrating an example process operable to facilitate a generation of information retrieved from probing packet responses.

FIG. 4 is a flowchart illustrating an example process 400 operable to facilitate a generation of information retrieved from probing packet responses. The process 400 may be carried out, for example, by a CPE device 105 of FIG. 1. The process 400 can begin at 405, where a WAN probing process is initiated. In embodiments, the WAN probing process may be initiated upon reboot of the CPE device 105, WAN PHY port state changes, or UI configuration changes. For example, a new round of auto detection at layer 2 and above may be initiated on the highest priority port (e.g., the PHY port selected by the WAN type module 270 of FIG. 2 for outputting probing packets). Auto detection may also restart when two and more PHY ports were connected, but the highest priority PHY port is disconnected. The second highest priority port on the search-list may then take over as the PHY port over which probing packets are output.

At 410, one or more probing packets may be output. The one or more probing packets may be output, for example, by the WAD prober 240 of FIG. 2. In embodiments, the WAD prober 240 may probe the WAN side network with a number of probing packets (e.g., 802.1x EAPOL START, PPPoE PADI, DHCP DISCOVER, etc.) by outputting the probing packets in parallel.

At 415, copies of each of the one or more probing packets may be output over one or more VLANs. The copies of each of the one or more probing packets may be output, for example, by the WAD prober 240. In embodiments, the WAD prober 240 may output copies of the probing packets over each of one or more VLANs. For example, the copies of the probing packets may be output over each of one or more VLANs that are identified from a VLAN search list with which the CPE device 105 is configured.

At 420, a determination may be made whether at least one probing packet response is received. The determination whether at least one probing packet response is received may be made, for example, by the WAD prober 240. In embodiments, responses to the probing packets may be received by the CPE device 105 and intercepted by the WAD prober 240. The WAD prober 240 may collect probing packet responses for a certain duration (e.g., for a configured timeout duration of 10, 15, 20 seconds, etc.).

If, at 420, the determination is made that no probing packet responses are received, the process 400 may return to 410. For example, if no probing packet responses are received upon the expiration of the certain duration, the WAD prober 240 may output another round of probing packets at 410.

If, at 420, the determination is made that at least one probing packet response is received, the process 400 may proceed to 425. At 425, a report of the received probing packet responses may be generated. The report of the received probing packet responses may be generated, for example, by the WAD prober 240. In embodiments, if one or more probing packet responses are received by the WAD prober 240, the WAD prober 240 may generate a report at the expiration of the certain duration. The report may provide an indication of whether an 802.1x authenticator (e.g., an 802.1x authenticator 110*a-d* of FIG. 1) has been detected and an identification of a VLAN over which the 802.1x authenticator was detected, whether a PPPoE server (e.g., PPPoE server 140 of FIG. 1) has been detected and an identification of a VLAN over which the PPPoE server was detected, whether a DHCP server (e.g., DHCP server 145 of FIG. 1) has been detected, an identification of a VLAN over which the DHCP server was detected, an IP used by the DHCP server, and/or other information gathered from the received probing packet response(s).

At 430, the report of the received probing packet responses may be output. In embodiments, the report generated by the WAD prober 240 may be output from the WAD prober 240 to a SDB 245 of FIG. 2, and the results gathered from the probing packet responses may be output to a WAD FSM 235 of FIG. 2.

Figure 5:
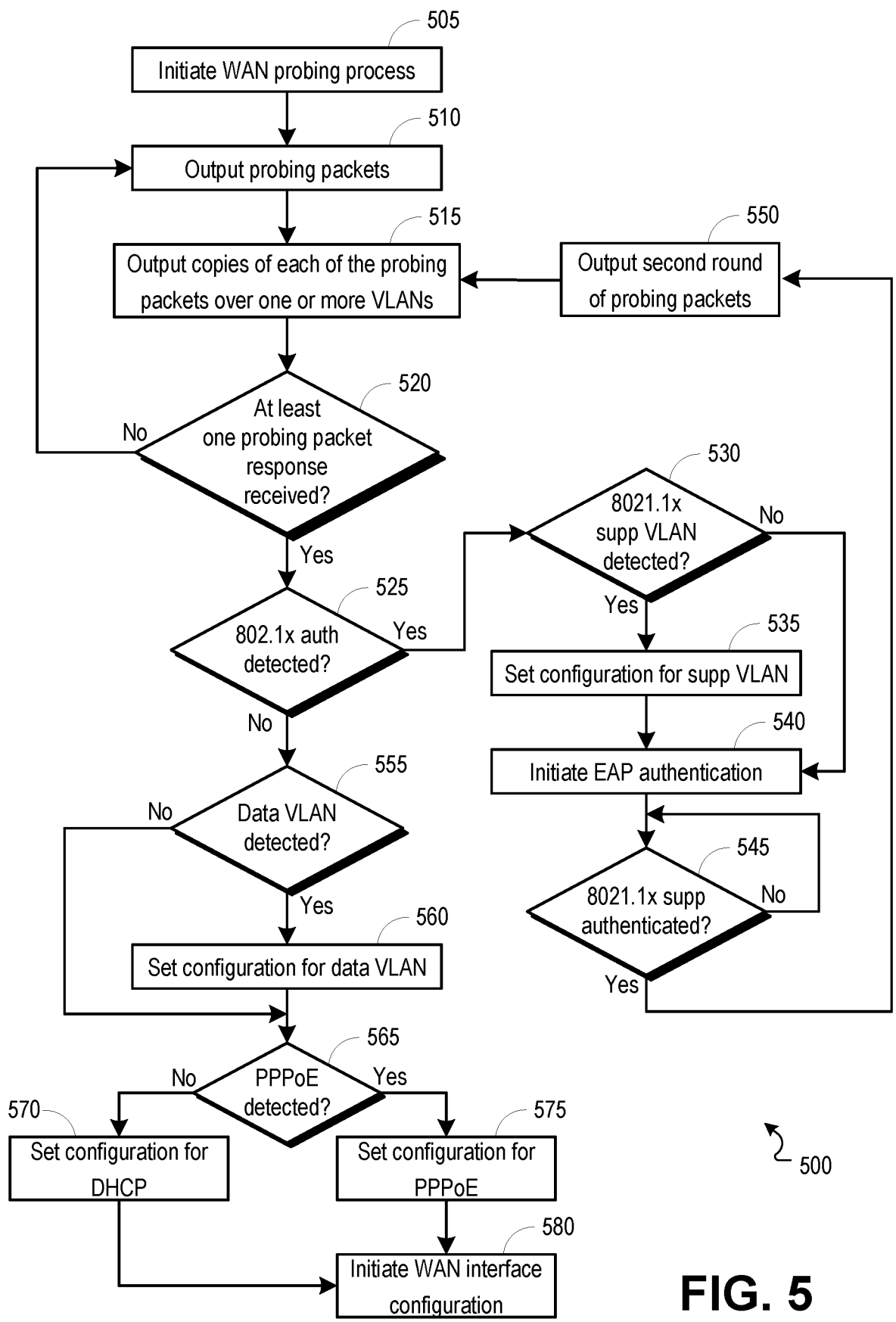
FIG. 5 is a flowchart illustrating an example process operable to facilitate a WAN detection and device configuration based upon the WAN detection.

FIG. 5 is a flowchart illustrating an example process 500 operable to facilitate a WAN detection and device configuration based upon the WAN detection. The process 500 may be carried out, for example, by a CPE device 105 of FIG. 1. The process 500 can begin at 505, where a WAN probing process is initiated. In embodiments, the WAN probing process may be initiated upon reboot of the CPE device 105, WAN PHY port state changes, or UI configuration changes. For example, a new round of auto detection at layer 2 and above may be initiated on the highest priority port (e.g., the PHY port selected by the WAN type module 270 of FIG. 2 for outputting probing packets). Auto detection may also restart when two or more PHY ports were connected, but the highest priority PHY port is disconnected. The second highest priority port on the search-list may then take over as the PHY port over which probing packets are output.

At 510, one or more probing packets may be output. The one or more probing packets may be output, for example, by the WAD prober 240 of FIG. 2. In embodiments, the WAD prober 240 may probe the WAN side network with a number of probing packets (e.g., 802.1x EAPOL START, PPPoE PADI, DHCP DISCOVER, etc.) by outputting the probing packets in parallel.

At 515, copies of each of the one or more probing packets may be output over one or more VLANs. The copies of each of the one or more probing packets may be output, for example, by the WAD prober 240. In embodiments, the WAD prober 240 may output copies of the probing packets over each of one or more VLANs. For example, the copies of the probing packets may be output over each of one or more VLANs that are identified from a VLAN search list with which the CPE device 105 is configured.

At 520, a determination may be made whether at least one probing packet response is received. The determination whether at least one probing packet response is received may be made, for example, by the WAD prober 240. In embodiments, responses to the probing packets may be received by the CPE device 105 and intercepted by the WAD prober 240. The WAD prober 240 may collect probing packet responses for a certain duration (e.g., for a configured timeout duration of 10, 15, 20 seconds, etc.).

If, at 520, the determination is made that no probing packet responses are received, the process 500 may return to 510. For example, if no probing packet responses are received upon the expiration of the certain duration, the WAD prober 240 may output another round of probing packets at 510.

If, at 520, the determination is made that at least one probing packet response is received, the process 500 may proceed to 525. At 525, a determination may be made whether a network access control authenticator (e.g., 802.1x authenticator 110a-d of FIG. 1) is detected. In embodiments, a WAD prober 240 may detect an 802.1x authenticator (e.g., 802.1x authenticator 110a-d of FIG. 1) when a response to an 802.1x supplicant packet (e.g., 802.1x EAPOL START packets) is received at the CPE device 105 from an 802.1x authenticator.

If, at 525, the determination is made that an 802.1x authenticator is detected, the process 500 may proceed to 530. At 530, a determination may be made whether an 802.1x supplicant VLAN is detected. In embodiments, the WAD FSM 235 of FIG. 2 (e.g., the 802.1x supp module 265 of FIG. 2 and the VLAN module 275 of FIG. 2) may determine whether an 802.1x supplicant VLAN is detected based upon the probing packet responses identified from the WAD prober 240 of FIG. 2.

If, at 530, the determination is made that an 802.1x supplicant VLAN is detected, the process 500 may proceed to 535. At 535, configuration for supplicant VLAN may be set. In embodiments, in response to a detection of an 802.1x authenticator, the CPE device 105 may setup a VLAN associated with the 802.1x client supplicant 260 and the 802.1x.

If, at 530, the determination is made that an 802.1x supplicant VLAN is not detected, the process 500 may proceed to 540. At 540, EAP authentication may be initiated. In embodiments, the CPE device 105 may be authenticated through a handshake process occurring between the 802.1x client supplicant 260 of FIG. 2 and the 802.1x authenticator over a TLS encryption tunnel.

At 545, a determination may be made whether the 802.1x supplicant is successfully authenticated. If, at 545, the determination is made that authentication of the 802.1x supplicant is unsuccessful, authentication may continue. If, at 545, the determination is made that authentication of the 802.1x supplicant is successful, the process 500 may proceed to 550. At 550, a second round of probing packets may be output. The second round of probing packets may be output, for example, by the WAD prober 240. The second round of probing packets may include all of the probing packets that were output by the WAD prober 240 at 510 except for 802.1x supplicant packets (e.g., 802.1x EAPOL START packets).

Returning to 525, if the determination is made that no 802.1x authenticator is detected, the process 500 may proceed to 555. At 555, a determination may be made whether a data VLAN is detected. If the determination is made that a data VLAN is detected, configuration for the data VLAN may be set at 560.

If, at 555, the determination is made that no data VLAN is detected, the process 500 may proceed to 565. At 565, a determination may be made whether a PPPoE server is detected. The determination whether a PPPoE server is detected may be based upon the one or more received probing packet responses. For example, if the WAD prober 240 receives a probing packet response from a PPPoE server, the WAD prober 240 may determine that a PPPoE server is detected. If the WAD prober 240 receives a probing packet response from a DHCP server, the WAD prober 240 may determine that a DHCP server is detected and the a PPPoE server is not detected. It should be understood that 565 may include a determination of whether a PPPoE server or a DHCP server is detected. If a DHCP server is detected, configuration for DHCP may be set at 570. If a PPPoE server is detected, configuration for PPPoE may be set at 575.

If, at 565, the determination is made that a PPPoE server is not detected, configuration for a DHCP server may be set at 570. Configuration for a DHCP server may be set, for example, by an SDB 245 of FIG. 2.

If, at 565, the determination is made that PPPoE server is detected, configuration for a PPPoE server may be set at 575. Configuration for a PPPoE server may be set, for example, by an SDB 245.

At 580, WAN interface configuration may be initiated. In embodiments, based upon the one or more received probing packet responses, the CPE device 105 may select a WAN protocol to setup, and the CPE device 105 may initiate a corresponding WAN protocol client (e.g., PPPD 255 of FIG. 2, DHCPCD 250 of FIG. 2, etc.). When a DHCP server is detected, the CPE device 105 may determine whether the retrieved DHCP server IP address is the same as the last or most recently used IP address, and the last or most recently used IP address may be renewed if it is determined to be the same as the retrieved DHCP server IP address. For example, the WAN protocol module 280 may check a WAN protocol search list to determine which WAN protocol to setup, and the WAN protocol module 280 may initiate the corresponding WAN protocol client.

Figure 6:
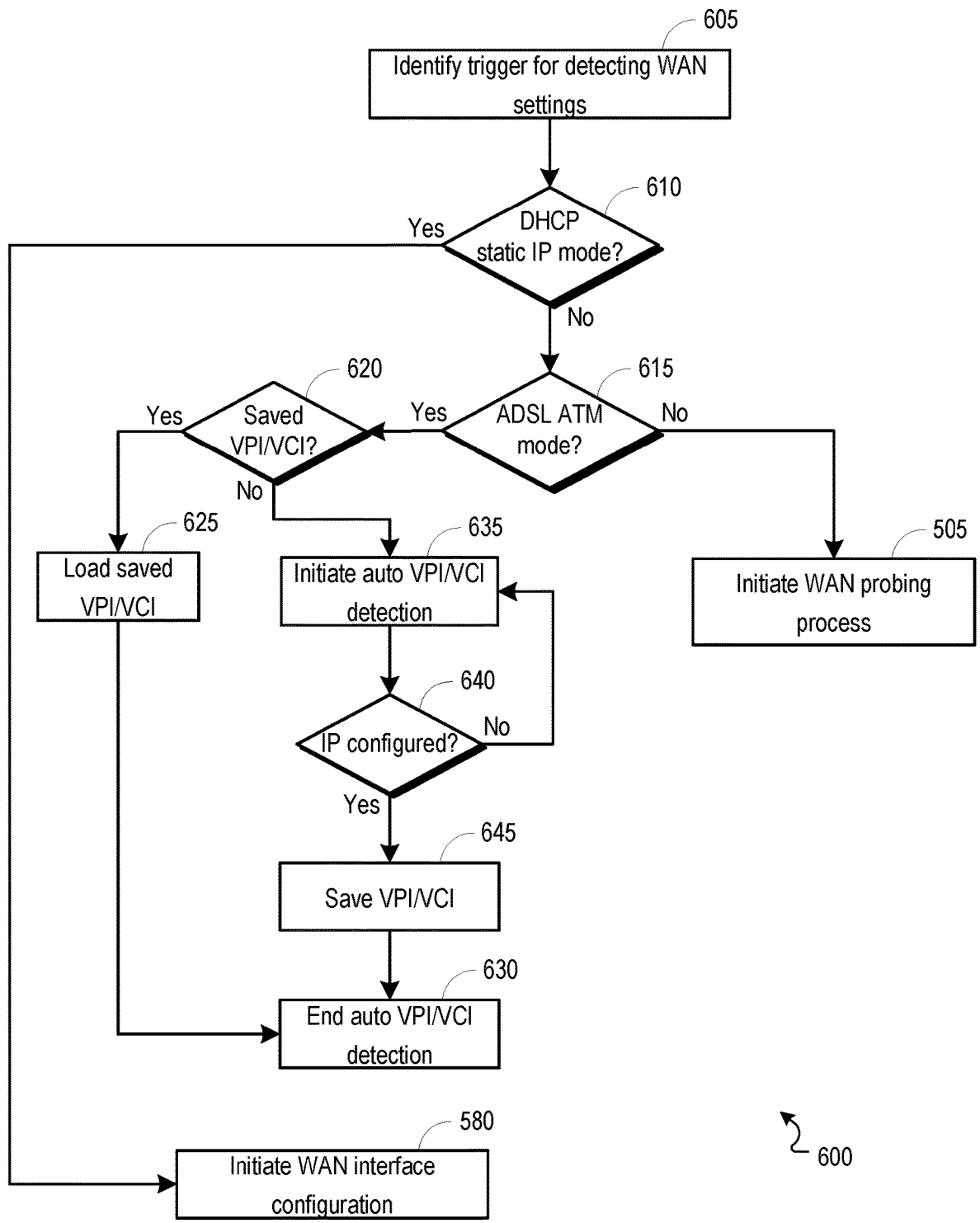
FIG. 6 is a flowchart illustrating an example process operable to facilitate WAN detection including a detection of ADSL ATM mode.

FIG. 6 is a flowchart illustrating an example process 600 operable to facilitate WAN detection including a detection of ADSL ATM mode. The process 600 may be carried out, for example, by a CPE device 105 of FIG. 1. The process 600 can begin at 605, when a trigger for detecting WAN settings is identified. In embodiments, the trigger for detecting WAN settings may be a reboot of the CPE device 105, a WAN PHY port change, a UI (user interface) configuration change, or other triggering event. The trigger may be an identification of a scenario in which two or more PHY ports are connected and the highest priority PHY port is disconnected. The trigger may be an identification of a scenario in which a PHY port is connected at the CPE device 105 and the PHY port has a higher priority than one or more PHY ports currently or previously connected at the CPE device 105.

At 610, a determination may be made whether a DHCP static IP mode is enabled. In embodiments, when the CPE device 105 is operating in a full static configuration mode or a DHCP static IP mode, all or part of the WAD FSM 235 of FIG. 2 may be bypassed. For example, when configured in DHCP static IP mode, a DHCP server is not available on the service provider's WAN network to respond to probing packets. When configured in DHCP static IP mode, autodetection may be carried out at the PHY driver level (e.g., the PHY line mode may be automatically detected), and the 802.1x supplicant, VLAN, and DNS settings may be configured manually at 580.

If, at 610, the determination is made that DHCP static IP mode is not enabled, the process 600 may proceed to 615. At 615, a determination may be made whether an ADSL ATM mode is enabled. If the determination is made that the ADSL ATM mode is not enabled, the CPE device 105 may initiate a WAN probing process at 505.

If, at 615, the determination is made that the ADSL ATM mode is enabled, the process 600 may proceed to 620. At 620, a determination may be made whether a VPI/VCI pair is saved. If the determination is made that a VPI/VCI pair is saved, the saved VPI/VCI pair may be loaded at 625 and the auto VPI/VCI detection may end at 630.

If, at 620, the determination is made that a VPI/VCI pair is not saved, the process 600 may proceed to 635. At 635, auto VPI/VCI detection may be initiated. In embodiments, the ADSL ATM driver 225 of FIG. 2 may use the first VPI/VCI pair found within a VPI/VCI search list, and the WAD FSM 235 of FIG. 2 may output probing packets (e.g., PADI and DHCP offer) on the VPI/VCI.

At 640, a determination may be made whether IP configuration is successful. If the determination is made that IP configuration is unsuccessful after a configured time out, the ADSL ATM driver 225 may select the next VPI/VCI pair found within the VPI/VCI search list, and the process 600 may return to 635 where the WAD FSM 235 may output probing packets over the next VPI/VCI pair.

If, at 640, the determination is made that IP configuration is successful over a VPI/VCI pair, the VPI/VCI pair may be saved at 645, and the automatic VPI/VCI detection process may end at 630. After saving the VPI/VCI, the CPE device 105 may be configured to use the saved VPI/VCI.

Figure 7:
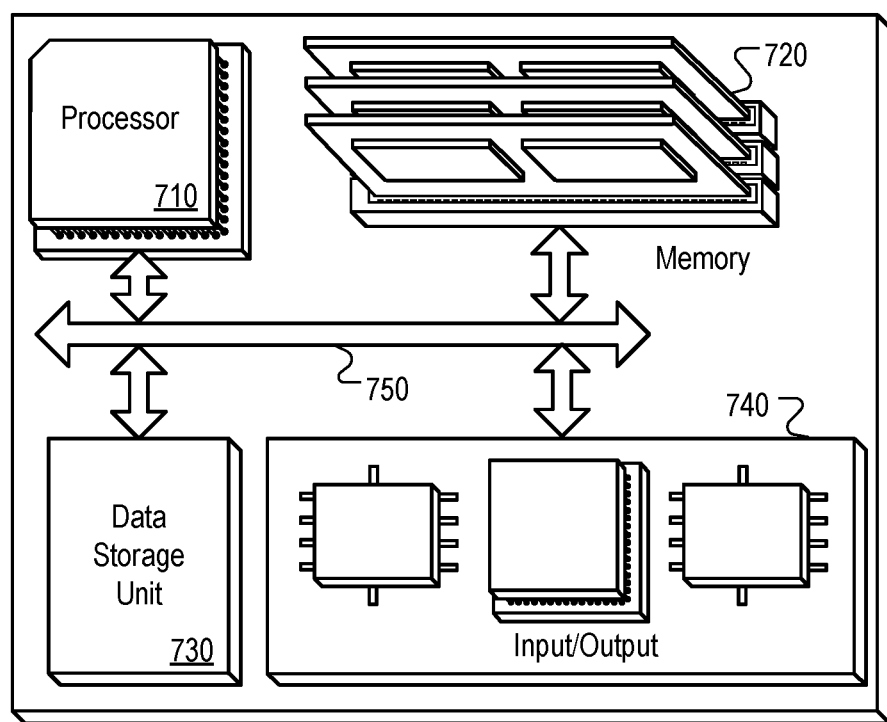
FIG. 7 is a block diagram of a hardware configuration operable to facilitate an automatic detection of WAN (wide-area network) configurations.

FIG. 7 is a block diagram of a hardware configuration 700 operable to facilitate an automatic detection of WAN (wide-area network) configurations. The hardware configuration 700 can include a processor 710, a memory 720, a storage device 730, and an input/output device 740. Each of the components 710, 720, 730, and 740 can, for example, be interconnected using a system bus 750. The processor 710 can be capable of processing instructions for execution within the hardware configuration 700. In one implementation, the processor 710 can be a single-threaded processor. In another implementation, the processor 710 can be a multi-threaded processor. The processor 710 can be capable of processing instructions stored in the memory 720 or on the storage device 730.

The memory 720 can store information within the hardware configuration 700. In one implementation, the memory 720 can be a computer-readable medium. In one implementation, the memory 720 can be a volatile memory unit. In another implementation, the memory 720 can be a non-volatile memory unit.

In some implementations, the storage device 730 can be capable of providing mass storage for the hardware configuration 700. In one implementation, the storage device 730 can be a computer-readable medium. In various different implementations, the storage device 730 can, for example, include a hard disk device, an optical disk device, flash memory or some other large capacity storage device. In other implementations, the storage device 730 can be a device external to the hardware configuration 700.

The input/output device 740 provides input/output operations for the hardware configuration 700. In embodiments, the input/output device 740 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to a CPE device 105 of FIG. 1. In embodiments, the input/output device can include driver devices configured to send communications to, and receive communications from one or more networks and/or upstream network elements.

Those skilled in the art will appreciate that the invention improves upon methods and systems for detecting WAN configurations and parameters. Methods, systems, and computer readable media can be operable to facilitate an automatic detection of WAN configurations. A CPE device may generate and output one or more probing packets to one or more upstream network elements. The CPE device may receive one or more probing packet responses from one or more of the upstream network elements. Based upon the received probing packet response(s), the CPE device may determine WAN configurations and parameters, and the CPE device may set WAN configurations accordingly.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

I claim:

1. A method comprising:
outputting a first round of one or more probing packets from a customer premise equipment device, wherein the one or more probing packets are simultaneously output in parallel;
receiving at least one probing packet response in response to the first round of probing packets;
based upon the at least one probing packet response, determining whether a network access control authenticator is detected;
if a network access control authenticator is not detected:
based upon the at least one probing packet response received in response to the first round of probing packets, determining whether a point-to-point protocol over Ethernet server or a dynamic host configuration protocol server is detected;
configuring a wide-area network client associated with point-to-point protocol over Ethernet if a point-to-point protocol over Ethernet server is detected; and
configuring a wide-area network client associated with dynamic host configuration protocol if a dynamic host configuration protocol server is detected; and
if a network access control authenticator is detected:
initiating authentication of a supplicant at the customer premise equipment device;
outputting a second round of one or more probing packets from the customer premise equipment device, wherein the one or more probing packets are simultaneously output in parallel;
receiving at least one probing packet response in response to the second round of probing packets;
based upon the at least one probing packet response received in response to the second round of probing packets, determining whether a point-to-point protocol over Ethernet server or a dynamic host configuration protocol server is detected;
configuring a wide-area network client associated with point-to-point protocol over Ethernet if a point-to-point protocol over Ethernet server is detected; and configuring a wide-area network client associated with dynamic host configuration protocol if a dynamic host configuration protocol server is detected.

2. The method of claim 1, wherein the probing packets are output over a physical port identified from one or more physical ports of the customer premise equipment device at which a connection is detected.

3. The method of claim 2, wherein the identified physical port is selected based upon a priority level associated with each of the one or more physical ports at which a connection is detected.

4. The method of claim 1, further comprising:
outputting copies of the one or more probing packets over one or more virtual local area networks.

5. The method of claim 1, further comprising:
based upon the at least one probing packet response, detecting a data virtual local area network; and
configuring a data virtual local area network at the customer premise equipment device.

6. The method of claim 1, wherein the received probing packet response are identified from a report generated by the customer premise equipment device.

7. A customer premise equipment device comprising one or more processors that cause the customer premise equipment device to:
output a first round of one or more probing packets, wherein the one or more probing packets are simultaneously output in parallel;
receive at least one probing packet response in response to the first round of probing packets;
based upon the at least one probing packet response, determine whether a network access control authenticator is detected;
if a network access control authenticator is not detected:
based upon the at least one probing packet response received in response to the first round of probing packets, determine whether a point-to-point protocol over Ethernet server or a dynamic host configuration protocol server is detected;
configure a wide-area network client associated with point-to-point protocol over Ethernet if a point-to-point protocol over Ethernet server is detected; and
configure a wide-area network client associated with dynamic host configuration protocol if a dynamic host configuration protocol server is detected; and
if a network access control authenticator is detected:
initiate authentication of a supplicant at the customer premise equipment device;
output a second round of one or more probing packets, wherein the one or more probing packets are simultaneously output in parallel;
receive at least one probing packet response in response to the second round of probing packets;
based upon the at least one probing packet response received in response to the second round of probing packets, determine whether a point-to-point protocol over Ethernet server or a dynamic host configuration protocol server is detected;
configure a wide-area network client associated with point-to-point protocol over Ethernet if a point-to-point protocol over Ethernet server is detected; and
configure a wide-area network client associated with dynamic host configuration protocol if a dynamic host configuration protocol server is detected.

8. The customer premise equipment device of claim 7, wherein the probing packets are output over a physical port identified from one or more physical ports of the customer premise equipment device at which a connection is detected.

9. The customer premise equipment device of claim 8, wherein the identified physical port is selected based upon a priority level associated with each of the one or more physical ports at which a connection is detected.

10. The customer premise equipment device of claim 7, wherein the one or more processors further cause the customer premise equipment device to output copies of the one or more probing packets over one or more virtual local area networks.

11. The customer premise equipment device of claim 7, wherein the one or more processors further cause the customer premise equipment to:
based upon the at least one probing packet response, detect a data virtual local area network; and
configure a data virtual local area network at the customer premise equipment device.

12. One or more non-transitory computer readable media having instructions operable to cause one or more processors to perform the operations comprising:
outputting a first round of one or more probing packets from a customer premise equipment device, wherein the one or more probing packets are simultaneously output in parallel;
receiving at least one probing packet response in response to the first round of probing packets;
based upon the at least one probing packet response, determining whether a network access control authenticator is detected;
if a network access control authenticator is not detected:
based upon the at least one probing packet response received in response to the first round of probing packets, determining whether a point-to-point protocol over Ethernet server or a dynamic host configuration protocol server is detected;
configuring a wide-area network client associated with point-to-point protocol over Ethernet if a point-to-point protocol over Ethernet server is detected; and
configuring a wide-area network client associated with dynamic host configuration protocol if a dynamic host configuration protocol server is detected; and
if a network access control authenticator is detected:
initiating authentication of a supplicant at the customer premise equipment device;
outputting a second round of one or more probing packets from the customer premise equipment device, wherein the one or more probing packets are simultaneously output in parallel;
receiving at least one probing packet response in response to the second round of probing packets;
based upon the at least one probing packet response received in response to the second round of probing packets, determining whether a point-to-point protocol over Ethernet server or a dynamic host configuration protocol server is detected;
configuring a wide-area network client associated with point-to-point protocol over Ethernet if a point-to-point protocol over Ethernet server is detected; and
configuring a wide-area network client associated with dynamic host configuration protocol if a dynamic host configuration protocol server is detected.

13. The one or more non-transitory computer-readable media of claim 12, wherein the probing packets are output over a physical port identified from one or more physical ports of the customer premise equipment device at which a connection is detected.

14. The one or more non-transitory computer-readable media of claim 13, wherein the identified physical port is selected based upon a priority level associated with each of the one or more physical ports at which a connection is detected.

15. The one or more non-transitory computer-readable media of claim 12, wherein the instructions are further operable to cause the one or more processors to perform the operations comprising:
 outputting copies of the one or more probing packets over one or more virtual local area networks.

16. The one or more non-transitory computer-readable media of claim 12, wherein the instructions are further operable to cause the one or more processors to perform the operations comprising:
 based upon the at least one probing packet response, detecting a data virtual local area network; and
 configuring a data virtual local area network at the customer premise equipment device.

17. The one or more non-transitory computer-readable media of claim 12, wherein the received probing packet response are identified from a report generated by the customer premise equipment device.

\* \* \* \* \*